3,285,267
QUICK RELEASE VALVE DEVICE
John A. Groth, Jeannette, Pa., assignor to Westinghouse Air Brake Company, Wilmerding, Pa., a corporation of Pennsylvania
Filed Mar. 13, 1964, Ser. No. 351,781
3 Claims. (Cl. 137—102)

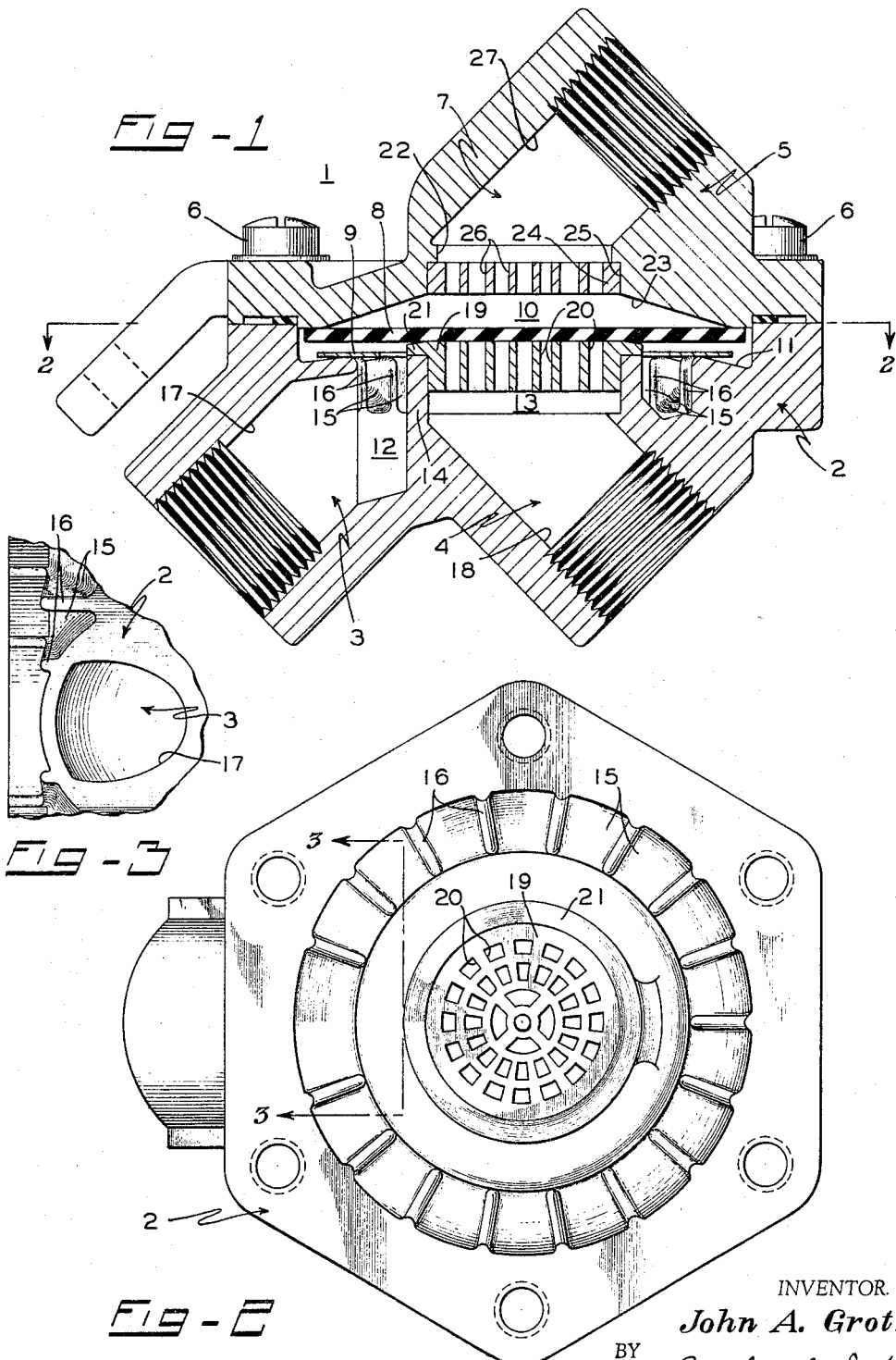

This invention relates generally to quick release valve devices, and relates specifically to valves of this type having a free floating movable disc valve member therein.

Heretofore, it has been proposed to construct a quick release valve in which a freely movable, flexible disc valve member is disposed in a valve chamber for movement in one direction perpendicular to its plane to seat upon an inlet or supply valve seat to seal the inlet port of a supply passage in one end of the chamber in response to a pressure reduction in the supply port, and alternatively movable in the opposite direction to seat simultaneuosly upon an exhaust port seat and a relatively larger delivery port seat concentrically disposed therewith in the other side of the chamber. In order to provide for passage of fluid from the supply inlet around and beneath the disc valve member to the delivery port when the disc valve member is sealing the exhaust port, the diameter of the valve chamber and the delivery port seat are larger than the diameter of the disc valve member, and the delivery port valve seat is radially ribbed to provide radially disposed grooves for free conductivity of the fluid from the supply passage to the delivery passage.

The foregoing valve construction is stationary. However, it has been observed that with heavy flow of fluid from the inlet pipe to the outlet or delivery pipe, the outside edge or periphery of the flexible disc valve member may be deflected or extruded into the grooves between the ribs to effect a chewing action on the flexible disc valve member. Further, when the disc valve member is disposed on the inlet valve seat, it may have a tendency to flutter or chatter because of its flexible structure.

The object of the present invention is to simply and inexpensively prevent the extrusion of the flexible valve member into the grooves in the above type of valve device during a delivery operation thereof, without inhibiting the valve action in any way, and to eliminate the deformation and fluttering or chattering action of the disc valve member.

In the present invention, the above object is achieved by disposing a free floating rigid washer member between the flexible valve member and the outlet valve seat. The width of the washer is selected so as to provide support for the periphery of the disc valve to prevent extrusion of the valve member into the grooves, thus increasing the valve capacity and eliminating the above-described chewing action upon the disc valve member. The outer diameter of the washer is substantially less than the diameter of the outlet valve seat and the chamber diameter to freely permit fluid flow around the edge of the washer into the grooves and so that random free lateral movement of the washer member with respect to the outlet valve seat will not appreciably change the total fluid flow around the washer even if the washer should at times engage a chamber wall in its lateral movement. The inner diameter of the washer is slightly greater than the outer diameter of the exhaust valve seat to assure the reseating of the washer on the outlet valve seat without engaging the exhaust valve seat when pressure in the inlet port is changed from one lesser than to one greater than the outlet port pressure. When the disc valve is disposed against the input valve seat in response to a preponderance of pressure in the outlet pipe, the washer rises in the valve chamber and comes to rest against the disc valve to apply pressure upon the peripheral edge thereof, thus eliminating the chattering action of the periphery of the disc valve member.

These and other objects of the invention will become more readily apparent when taken in conjunction with the following description and the drawings, in which:

FIG. 1 is a sectional view of a quick release valve device showing the present invention;

FIG. 2 is a top plan view of the valve device of FIG. 1 taken substantially along the lines 2—2 of FIG. 1, with the cover, disc valve, and washer member removed; and FIG. 3 is a sectional view of the valve device of FIG. 2 taken along the lines 3—3 of FIG. 2.

Referring now to FIG. 1 of the drawings, there is shown a quick release valve generally indicated by the reference numeral 1, which valve comprises generally a valve body 2 having an outlet means or delivery port means 3 and an exhaust means 4 therein, a cover member 5 attached to the body 2 by any suitable means, such as by bolts 6, and having a supply means 7 therein, a free floating flexible disc valve member 8, and a washer member 9 associated with the disc valve member 8. The disc valve 8 and washer member 9 are each disposed in a free floating manner within the valve chamber 10 formed between the valve body 2 and cover member 5.

The bottom wall 11 of cavity 10 is centrally provided with a pair of concentric cavities 12 and 13 separated by an annulus 14, the outer cavity 12 being annular in form and comprising the delivery port of the previously-described delivery means 3, and the inner cavity 13 comprising the exhaust port of the previously-mentioned exhaust means 4. The bottom wall 11 comprises the outlet valve seat for disc valve 8 and slopes conically upwardly and inwardly of the chamber 10. The lower wall 11 is provided with a plurality of equally spaced grooves 15 which extend radially inwardly from the edges of chamber 10 and slope downwardly to intersect the walls of delivery port 12. The remaining ungrooved portions of bottom wall 11 comprise equally spaced, vertically disposed radial rib members 16 for supporting the hereinbefore-mentioned disc valve member 8. The previously-mentioned delivery means 3 further includes a diagonally upwardly extending, internally threaded passage 17 laterally intersecting the delivery port 12. The previously-mentioned exhaust means 4 further includes a diagonally upwardly extending, internally threaded passage 18 intersecting the exhaust port 13 at its lower end.

The upper end of exhaust port 13 is provided with a cylindrical grill member 19 having a suitably apertured central portion 20 forming a grill, the cylinder being fitted in the port 13 and being provided with an annular flange 21 at its upper end overlying the top of annulus 14. The top surface of the cylinder 19, including the flange 21, comprises a valve seat for the disc valve member 8. The top surface of flange 21 is sloped outwardly to provide better sealing and to allow greater freedom of downward movement for the outer periphery of disc valve 8, as hereinafter more fully explained.

The supply means 7 comprises a centralized supply port 22 centrally disposed in the centrally sloping inner wall 23 of the cover member 5, the wall 23 comprising the delivery port seat for the disc valve member 8. A cylindrical grill member 24 is fitted in a counterbore 25 in supply port 22, and is centrally apertured at 26 to pass fluid therethrough. A threaded delivery passage 27 in cover 5 communicates with the upper end of port 22 to supply fluid thereto.

The disc valve member 8 comprises a thin circular member composed of any suitable flexible material, such as rubber, and has an outside diameter less than that of the chamber 10 but greater than that of the delivery port 12 so that the disc 8 overlies both the exhaust port 13 and delivery port 12 simultaneously, but, at the same time, permits fluid flow from the supply port 22 around the disc 8, through the grooves 15 to the delivery port 12 when the pressure in supply passage 27 predominates over that in delivery passage 17, as hereinafter described in the operation of the valve device.

In order to provide a rigid support for the outer periphery of disc valve 8 to prevent its extrusion into the grooves 15, there is provided in chamber 10 a free floating washer member 9 disposed between the disc valve 8 and the lower wall 11 of chamber 10. The washer 9 may be constructed of any suitable rigid material, such as metal or plastic, and has an outside diameter less than the diameter of wall 11 to allow free passage of fluid around the valve member 8 and has an inside diameter greater than the outside diameter of annulus 14 to permit the washer to seat upon the rib members 16. The washer has free limited movement both laterally and vertically in chamber 10, for reasons hereinafter more fully described in the operation of the valve device.

The valve device is shown in FIG. 1 in the rest or no-pressure or equal-pressure condition, in which the fluid pressure in supply passage 27 equals the pressure in delivery passage 17.

When the pressure in supply port 27 predominates over the pressure in delivery port 17, the peripheral edge of disc valve 8 is caused to flex downwardly effecting a seating of the central portion of the disc valve 8 upon the grill member 19, thus closing the exhaust port 13, and, at the same time, permits the free flow of fluid around the periphery of the disc valve 8 through the grooves 15 to delivery port 12 whereupon fluid is passed through passage 17 to be delivered to the device to be operated thereby. The upwardly sloping nature of the bottom wall 11 in chamber 10 provides for a free flow of fluid through the grooves 15 in that the periphery of valve member 8 is thus disposed a substantial distance above the grooves 15 at their outer ends. The washer member 9, being rigid in nature, prevents the periphery of the disc valve 8 from extrusion into the grooves 15 and thus prevents a decrease in fluid capacity of the valve device 1. When the fluid pressure in passage 27 is reduced below that of the pressure in delivery passage 17, the predominant force on the lower side of disc valve 8 thus effects an upward movement of the disc valve 8 away from the exhaust valve seat 21 whereupon the same is flexed against the valve seat 23 and the grill member 24 to seal off the supply port 22. The exhaust port 13 is thus opened and fluid pressure flows from passage 17 to delivery port 12 through grill member 19 to exhaust port 13 and exhaust passage 18. The washer member 9, in response to the pressure from the delivery passage 17, will rise with valve member 8 to engage the periphery of disc valve member 8 pressing the same against the edges of valve seat 23 to prevent a chattering action of the disc valve member 8.

Having now described the invention, what I claim as new and desire to secure by Letters Patent, is:

1. A quick release valve device, comprising:
 (a) a body member having a valve chamber therein,
 (b) an exhaust port and a delivery port coaxially disposed in one side of said chamber, said exhaust port disposed concentrically within said delivery port,
 (c) a supply port disposed in the opposite side of said chamber,
 (d) an exhaust valve seat associated with said exhaust port, a delivery valve seat associated with said delivery port, and a supply valve seat associated with said supply port,
 (e) groove means radially disposed in said delivery valve seat communicating the surface of said delivery valve seat with the interior of said delivery port,
 (f) a flexible disc valve disposed within said chamber and floatingly movable from a first position on said one side of said chamber simultaneously engaging both said exhaust valve seat and said delivery valve seat to a second position on said opposite side of said chamber engaging said supply valve seat, said disc valve member having a diameter greater than said delivery valve port but less than the diameter of said chamber,
 (g) rigid means associated with said delivery valve seat for preventnig extrusion of the disc valve member into said grooves when a preponderance of pressure in said supply port over that in said delivery port forces said disc valve member to seat upon said exhaust valve seat and said delivery port seat whereby free flow of fluid is permitted around the disc valve member through said grooves into said delivery port.

2. The quick release valve device as recited in claim 1, and further characterized in that said rigid means comprises a washer member disposed between said disc valve member and said delivery valve seat, said washer having an outside diameter less than the width of the chamber and having an inside diameter greater than the exhaust valve seat.

3. The quick release valve device as recited in claim 2, and further characterized in that said washer member is independently floatingly movable whereby a preponderance of pressure in said delivery port over that in said supply port provides a force moving said disc valve member to said second position in sealing relationship with said supply valve seat effecting movement of said washer member into engagement with the periphery of said disc valve member to press the edges thereof against said supply valve seat to prevent chattering of said disc valve member.

No references cited.

WILLIAM F. O'DEA, *Primary Examiner.*

H. WEAKLEY, *Examiner.*